United States Patent
Potteiger (10) Patent No.: US 7,562,202 B2
(45) Date of Patent: Jul. 14, 2009

(54) SYSTEMS, METHODS, COMPUTER READABLE MEDIUM AND APPARATUS FOR MEMORY MANAGEMENT USING NVRAM

(75) Inventor: David Potteiger, Pasadena, MD (US)

(73) Assignee: United Parcel Service of America, Inc., Atlanta, GA (US)

(*) Notice: Subject to any disclaimer, the term of this patent is extended or adjusted under 35 U.S.C. 154(b) by 360 days.

(21) Appl. No.: 10/903,020

(22) Filed: Jul. 30, 2004

(65) Prior Publication Data

US 2006/0026211 A1    Feb. 2, 2006

(51) Int. Cl.
G06F 12/06   (2006.01)
G06F 12/00   (2006.01)
G06F 13/00   (2006.01)
G06F 13/28   (2006.01)

(52) U.S. Cl. .................. 711/165; 711/5; 711/154
(58) Field of Classification Search .................. 711/118
See application file for complete search history.

(56) References Cited

U.S. PATENT DOCUMENTS

| | | | |
|---|---|---|---|
| 4,571,674 A | 2/1986 | Hartung | |
| 5,276,840 A | 1/1994 | Yu | |
| 5,481,701 A | 1/1996 | Chambers, IV | |
| 5,694,570 A | 12/1997 | Beardsley et al. | |
| 5,911,084 A | 6/1999 | Jones et al. | |
| 6,189,081 B1* | 2/2001 | Fujio | 711/171 |
| 6,249,841 B1* | 6/2001 | Sikes et al. | 711/107 |
| 6,321,293 B1 | 11/2001 | Fabrizio et al. | |
| 6,651,142 B1 | 11/2003 | Gorelik et al. | |
| 6,742,084 B1 | 5/2004 | Defouw et al. | |
| 2002/0051394 A1 | 5/2002 | Tobita et al. | |
| 2003/0120841 A1* | 6/2003 | Chang et al. | 710/52 |
| 2004/0193782 A1* | 9/2004 | Bordui | 711/103 |
| 2005/0050261 A1* | 3/2005 | Roehr et al. | 711/103 |
| 2005/0132128 A1* | 6/2005 | Lee | 711/103 |

FOREIGN PATENT DOCUMENTS

WO   WO 2004/059651 A2   7/2004

OTHER PUBLICATIONS

Wikipedia, File Allocation Table, retrieved from http://en.wikipedia.org/wiki/File_Allocation_Table on Nov. 13, 2008, 23 pages.*
Microsoft Corporation. System Memory Management in Windows CE.NET [online], Oct. 2002 [retrieved on Jun. 9, 2004]. Retrieved from the Internet: <URL: http://msdn.microsoft.com/library/default.asp?url=/library/en-us/dncenet/html/systemmemorymgmtwince.asp>.

(Continued)

Primary Examiner—Hyung S Sough
Assistant Examiner—Gary W Cygiel
(74) Attorney, Agent, or Firm—Alston & Bird LLP (57) ABSTRACT

A system and method is disclosed for improving data integrity and the efficiency of data storage in separate memories of a computing device. In particular, the present invention introduces a combination of two types of memory, namely, an NVRAM and a Flash memory, as persistent memory for storing file data. By constantly caching a last data portion of a data file in an NVRAM, it avoids any sector erasing for individual bits in a Flash memory. Such an approach increases the data storage efficiency and life expectancy of a Flash memory. The present invention has very broad application in almost all computing devices, including any PC (desktop or laptop) and server computers. It demonstrates particularly advantageous performance in portable electronic devices implementing Windows™ CE operating systems.

26 Claims, 5 Drawing Sheets

OTHER PUBLICATIONS

Datalight. Seamless Flash Memory Under Windows CE White Paper [online], May 2001 [retrieved on Jun. 9, 2004]. Retrieved from the Internet: <URL: http://www.datalight.com/resource.asp>.

Datalight. Managing Resident Flash Memory to Increase Data Integrity and Device Reliability White Paper [online], May 2001 [retrieved on Jun. 9, 2004]. Retrieved from the Internet: <URL: http://www.datalight.com/resource.asp>.

International Search Report from corresponding International Application No. PCT/US2005/024586 dated May 7, 2006.

* cited by examiner

SYSTEMS, METHODS, COMPUTER READABLE MEDIUM AND APPARATUS FOR MEMORY MANAGEMENT USING NVRAM

FIELD OF THE INVENTION

The present invention relates generally to the field of memory storage topologies and, more particularly, to a system and method for improving data integrity and the efficiency of data storage in separate memories of a computing device. It yields especially good memory performance in hand held computing devices implementing Windows™ CE operating systems.

BACKGROUND OF THE INVENTION

Electronic memory comes in a variety of forms to serve a variety of purposes. Typically, a single electronic computing device includes several tiers of different memories. Such tiering philosophy in memory design helps maximize data storage for quick and easy access by powerful CPUs, while minimizing the memory cost.

Specific to handheld computing devices, many of them includes two kinds of memory, namely a Random Access Memory (RAM or DRAM) and programmable permanent memory. Generally, software applications are loaded, executed, and run in RAM. RAM is also used to receive data input by the user, as well as to display the application output or results to the user. The tasks of receiving data and displaying results are generally performed quickly in the RAM, allowing the user to input data freely, without the delay of storing the data in a more permanent memory. The amount of RAM available generally contributes to the perceived speed of the device. The speed of most RAM configurations, however, must be balanced with the risk of losing data or results. That is, RAM is sometimes called volatile memory because it requires a constant supply of electrical energy to maintain its data. As such, if the supply of electrical power is lost, the data in the RAM will also be lost.

Most types of permanent memory are non-volatile; that is, the permanent memory retains the data even if electrical power is lost. Most permanent memory is programmable, and thus suitable for storing software applications, and erasable, so that the memory can be re-programmed. Generally, selected data can be purposely stored in the permanent memory for later use. For example, the user might make ten quick data entries into the RAM, and then later store the data entries in the permanent memory.

In use, many portable electronic devices are subject to environmental forces, electronic failure, loss of power, and/or other catastrophic events that can automatically and abruptly erase the contents of the RAM. Once the input data stored in the RAM is lost, it cannot be recovered for storage in the permanent memory. Thus, there exists a need for a non-volatile memory to quickly receive and store data, even in the event of a total failure of the device from a catastrophic event, and to provide long-term storage of the data.

Currently, a block-accessed Flash memory is considered to an improved non-volatile memory implemented in portable computing devices. As a type of EEPROM, the Flash memory provides a non-volatile, lower power, low cost, and high-density storage device for programmable code and data. These characteristics make the Flash memory an optimal non-volatile memory device for embedded systems. However, the Flash memory also has a number of undesirable features when implemented in computing devices.

One problem is erase sectors. Unlike a RAM or ROM device, the individual bits of the Flash memory device (e.g. NAND Flash memory) can only be programmed in one direction and cannot be re-programmed without an erase operation. An erase operation for the Flash memory requires that a large section of bits, an erase sector, to be "flashed" or erased at the same time. Such an erase sector is typically 64 KB, but can range from 512 bytes to 512 KB, determined by the type of the Flash memory and how it is wired into the system. Additionally, the erase operations are quite slow, typically one half second or so, while a single byte can usually be programmed in about ten microseconds.

This sector-erasing feature of the Flash memory also makes it difficult to maintain data integrity. When using RAM or a conventional disk for storage, data of virtually any size can be written and re-written into the same location without any special handling. Since the Flash memory is not capable of re-writing individual bits of data, all data must be initially written, or re-written, into an unused area of the Flash memory. The original data must then be tracked to free up space in the memory for purposes of sector erasing. When data write and re-write operations are performed on the Flash device, the controlling software must protect the data at every state of the operation to ensure that the original and new data remain valid in the event of an interruption. Interruptions can be caused by several common conditions, such as unexpected power loss due to low battery or a user request to shut down.

Another aspect of the Flash memory that must be considered is its limited life expectancy. For any given Flash memory device, there is a limit to the total number of erase operations that may be performed on a particular erase sector before it becomes unreliable or damaged. Flash memory device lifetimes range from 10,000 write-erase cycles to 1,000,000 cycles, with most rated around 100,000. When an erase sector approaches its rated limit, it may take longer to perform certain operations or even begin to fail.

To combat the above-identified problems, some special types of software are provided to manage the Flash memory. One example is called a Flash media manager in the present market. To maximize the life cycle of a Flash device, the media manager introduces a process called wear leveling, which consists of ensuring all erase sectors within the Flash disk are used with the same frequency. Another process called garbage collection is deployed to reclaim space occupied by discarded data. This process selects an erase sector that has mostly discarded data, copies the valid data from that erase sector into the spare sector, and erases the previously valid erase sector making it the new spare sector. However, inclusion of any of the above-mentioned special software requires overhead space allocated in the Flash memory for storing data identifying/recording the status of the Flash memory, maintaining a file allocation table to track the location and status of stored data, and reserving spare space for garbage collection. Such overhead not only decreases the actual space for data storage, but also results in speed degradation in the Flash memory.

Therefore, there exists a need for a non-volatile memory that overcomes the deficiencies of a Flash memory and provides fast data storage. The emerging Non-Volatile Random Access Memory (NVRAM) appears to meet this need. An NVRAM is a special kind of RAM that retains data when the computer is turned off or there is a power failure. Similar to the computer's Read Only Memory (ROM), NVRAM is powered by a battery within the computer. When the power is turned on, the NVRAM operates just like any other RAM. When the power is turned off, the NVRAM draws enough power from the battery to retain its data. NVRAM is fairly common in embedded systems. However, NVRAM is much more expensive than other RAM because of the battery. Also, NVRAM is generally less dense than other RAM, particularly DRAM. Thus, its applications are typically limited to the storage of a few hundred bytes of system-critical information that cannot be stored in a better way.

BRIEF SUMMARY OF THE INVENTION

In light of the above, the invention seeks to provide non-volatile, reliable and fast data storage devices at reasonable costs. Specifically, the invention seeks to make a combined use of various existing memory devices, such as a NVRAM and a Flash memory, in one computing device (especially an electronic portable device) so as to obtain optimal performance of data storage and deployment. To that end, the invention further seeks to provide underlying mechanisms in support of the combined use, which would facilitate data transfer between different memories without compromising data integrity.

In accordance with the present invention, the above objects and other objects, features, and advantages will be carried out by a method and system for memory management. The method comprises the steps of: receiving file data in a computing device; processing the file data to determine that the file data is composed of one or more data blocks, each having a pre-determined block size, and a last data portion having a smaller size than the pre-determined block size; writing the data blocks into a first memory that is configured to store data blocks having said pre-determined block size; and caching the last data portion in a second memory prior to transmitting said last data portion to said first memory. In one preferred embodiment, the second memory is a non-volatile random access memory, and the last data portion is cached through the steps of: allocating part of the second memory as a file buffer to store file data; writing data bytes of the last data portion in the file buffer until the file buffer includes data more than the pre-determined block size; and responsive to the determination that the file buffer includes data more than the pre-determined block size, moving data from the file buffer to the first memory prior to continuing to write date bytes of the last data portion into the file buffer.

Also provided in the present invention is a computer readable medium comprising executable instructions to perform the above-described steps.

According to another aspect of the present invention, a system is provided, comprising: a processor configured to receive and process data; a memory comprising at least a first memory and a second memory; and a data manager executed by said processor. The data manager is configured to define within the data a number of data blocks, each having a pre-determined block size, and a last data portion that has a smaller size than said pre-determined block size. It is further configured to allocate space in the first memory for storing the data blocks and assign space in the second memory for caching the last data portion. In a preferred embodiment, the last data portion is cached into the second memory through the steps of: allocating part of the second memory as a file buffer that is configured to store file data; writing data bytes of the last data portion to said file buffer until data in the file buffer is determined to have said pre-determined block size; and responsive to the determination that the data in the file buffer has such pre-determined block size, moving data from the file buffer to the first memory prior to continuing to write date bytes of the last data portion to the file buffer. In a preferred embodiment, the first memory is a Flash memory, whereas the second memory is a non-volatile random access memory.

Another embodiment of the present invention is particularly directed to a hand held apparatus, which includes: a data input device; a data output device; and a computing device configured to communicate with the data input device, data output device, and a data source via a communications network. The computing device comprises a processor for data processing, a memory comprising at least a non-volatile random dom access memory and a block-accessed memory and a data manager. The data manager is executed by the processor to perform instructions comprising the steps of: (A) identifying, from a file data input, one or more data blocks, each having a threshold block size, and a last data portion that has a smaller size than the threshold block size; (B) storing the data blocks into the block-accessed memory; (C) writing the last data portion by byte into the non-volatile random access memory until the non-volatile random access memory is determined to include file data of a threshold block size; and (D) responsive to the determination that said non-volatile random access memory is determined to include file data of a threshold block size, moving the file data from said non-volatile random access memory to the block-accessed memory prior to continuing Step (C).

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
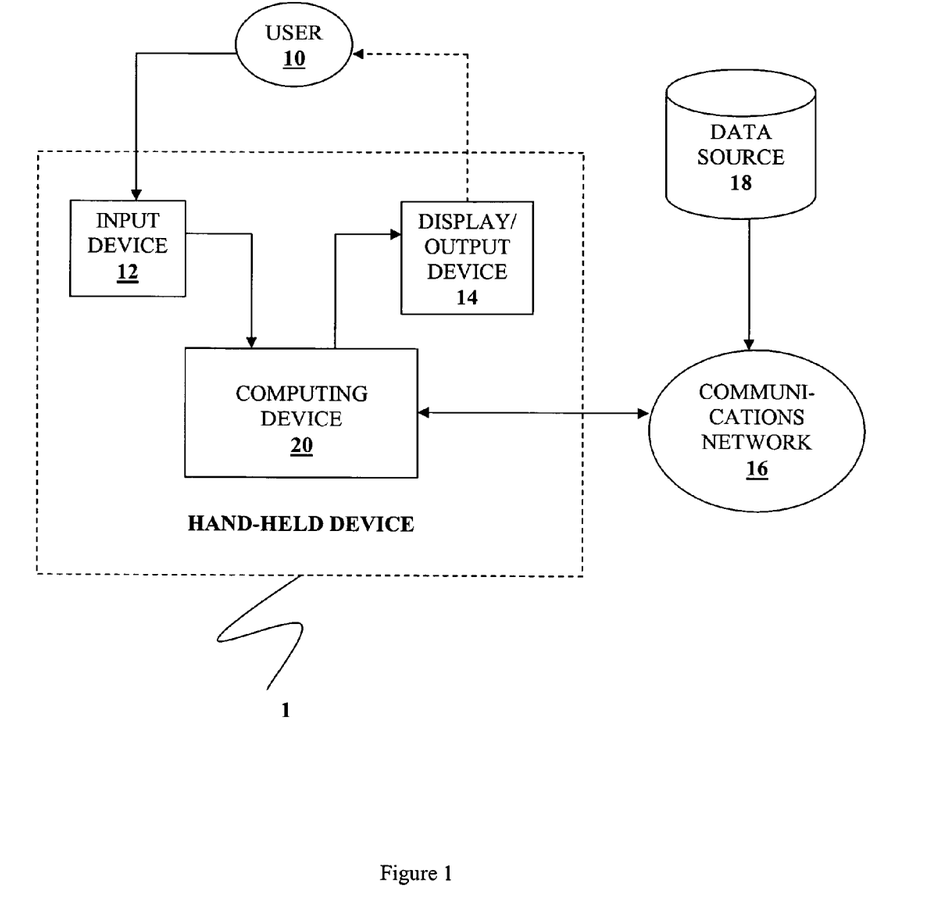
FIG. 1 shows a hand held computing device according to one embodiment of the present invention.

Turning to FIG. 1, a handheld device 1 is shown according to one embodiment of the present invention. Such handheld device 1 can be any portable computing device, including, but not limited to, a Personal Digital Assistant (PDA), a Smart Phone (SP), a notebook computer, a tablet computer and a Delivery Information Acquisition Device (DIAD). As illustrated in FIG. 1, this hand held device 1 is mainly composed of, besides other well-known necessary components not shown in the figure, an input device 12, an output or display device 14 and a computing device 20. In operation, the handheld device can receive data from a user 10 through user input (e.g., keyboard entry, bar-code scanning), or, over a communications network 16, from a data source 18 (e.g., electronic data transfer). The data source 18 can be any database on a server computer. In the package delivery context, for example, it can be a carrier's shipping database or a customer's database that is accessible to the computing device 20 by either a wired or wireless connection over the communications network 16, which can be the Internet, a LAN or WAN. Then shipping data or package information can be downloaded from a database and captured into the handheld device 1, which can be a DIAD in this context.

Figure 2:
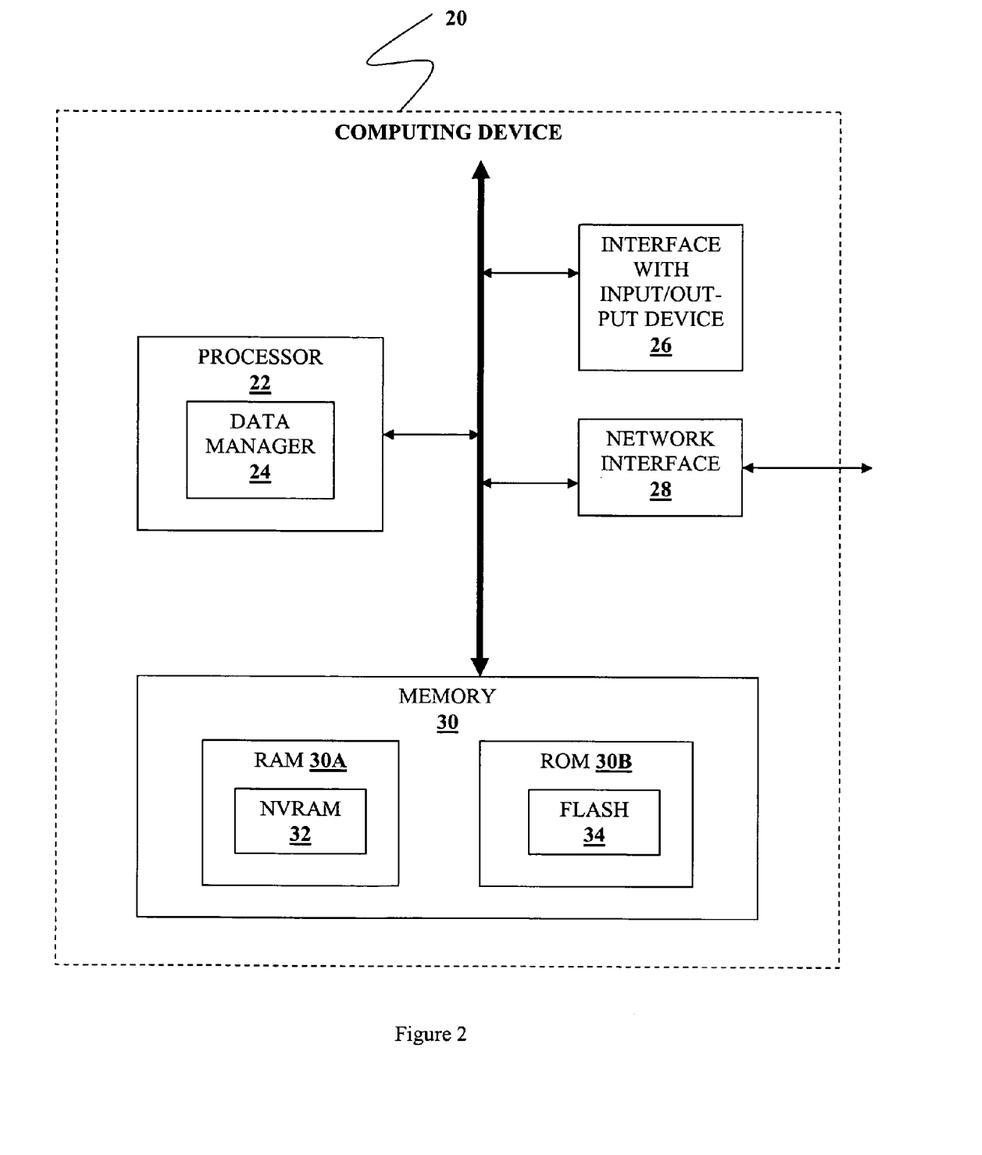
FIG. 2 shows components of a computing device according to one embodiment of the present invention.

FIG. 2 provides a block diagram of various components inside the computing device 20. It includes at least (1) a processor 22 that executes a data manager 24, which comprises programmed instructions for memory management, (2) an interface 26 to interact with the input device 12 or the output device 14, (3) a network interface 28 to communicate with the communications network 16, and (4) a memory 30. The memory 30 comprises at least two kinds of memory: a DRAM 30A and a ROM 30B. In a preferred configuration of the present invention, a Non-volatile RAM (NVRAM) 32 is employed in addition to the regular RAM 30. As to the ROM 30B, typically, a Flash memory 34 is used in the invention.

Figure 3:
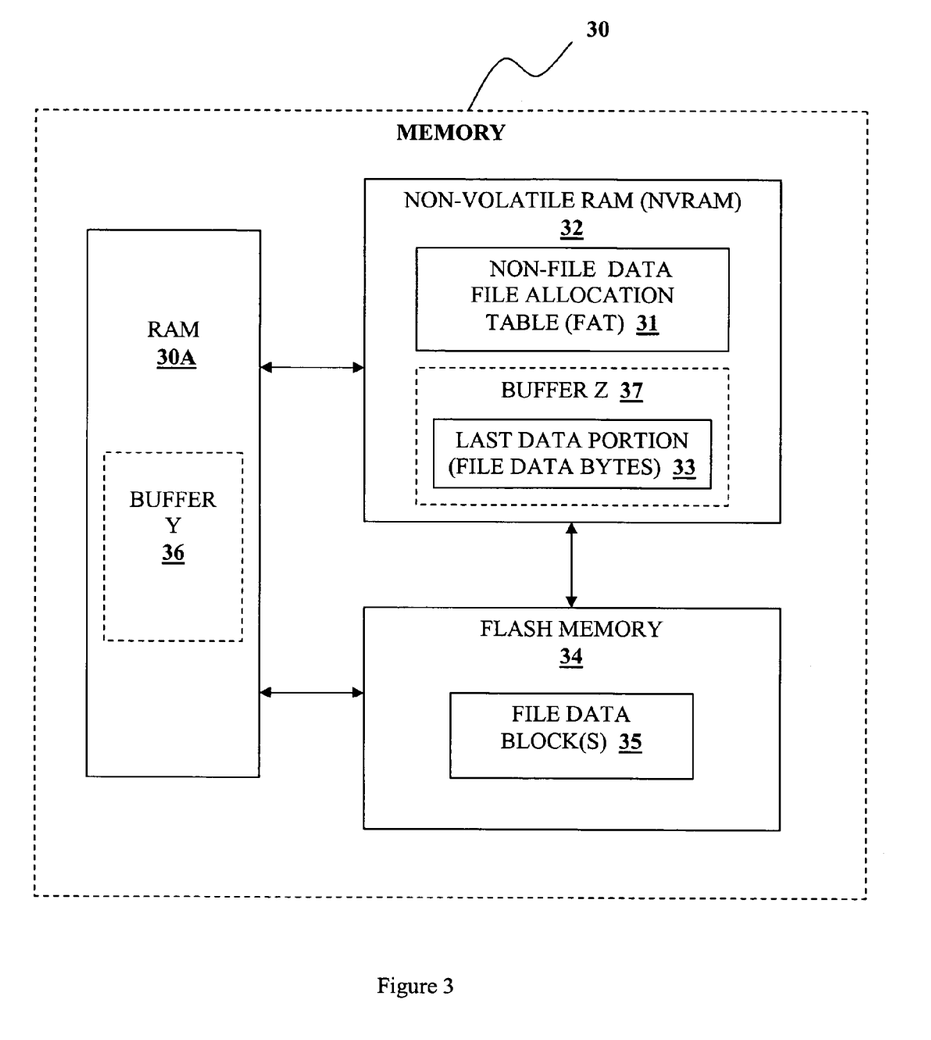
FIG. 3 shows components of a memory in the computing device in FIG. 2 according to one embodiment of the present invention.

FIG. 3 is a detailed illustration of respective data storage in each particular type of memory in the memory 30. As seen in this figure, there is data exchange between the DRAM 30A, NVRAM 32 and the Flash memory 34. In particular, the flash memory 34 stores file data blocks 35. Each data block is defined to include a pre-determined block size of data bytes. Such pre-determined block size is typically 512 bytes, but may be varied depending on the particular size of erasing sectors of the Flash memory 34. As noted above, an erase sector, which is typically 64 KB, but can range from 512 bytes to 512 KB. One use of NVRAM 32 is to store non-file data 31, which is typically a File Allocation Table (FAT) 31. FAT 31 is maintained in NVRAM 32 to track the location and status of file data stored in both NVRAM 34 and the Flash memory 34. NVRAM 32 is also used to store file data bytes called a last data portion 33 in a buffer Z 37. The DRAM 30A contains another buffer Y 36. Both buffer Y 36 and buffer Z 37 are configured to include sufficient memory space for holding one data block.

Figure 4:
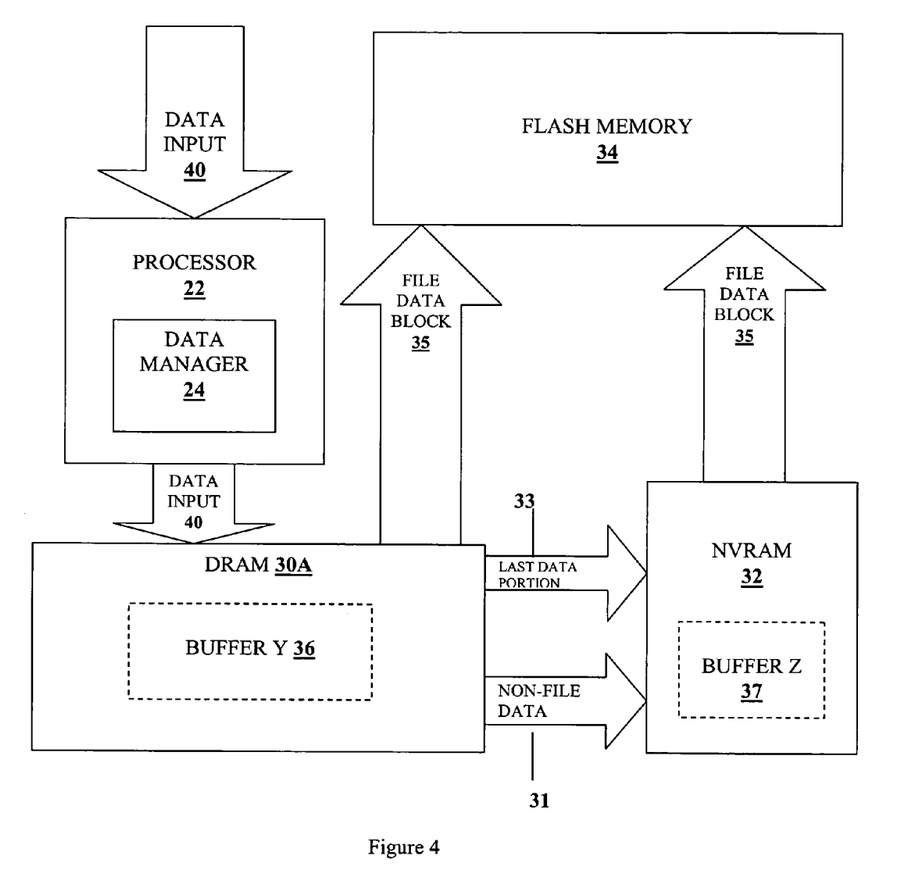
FIG. 4 illustrates a data flow in data processing for memory management according to one embodiment of the present invention.

In FIG. 4, a data input 40 is received by the processor 22. The processor 22, coupled with the DRAM containing the buffer Y 36, processes the data input 40 to determine in which memory it should be stored pursuant to the programmed instructions of the data manager 24. As illustrated in FIG. 4, the data input 40 eventually results in three streams of data: (1) file data blocks 35, (2) last data portion (file data bytes) 33 and (3) non-file data (FAT) 31 that is generated or updated for identifying or recording the status of the data input 40. The file data blocks 35 will be written directly into the Flash memory 34, while the last data portion 33 and the FAT 31 will be stored in the NVRAM 32. The process of writing the last data portion 33 into the NVRAM 32 prior to transferring it to the Flash memory 34 is called caching, which will be described in detail below. As additional data is continuously received into the DRAM 30A, another last data portion will be written into the NVRAM 32 until the buffer Z 37 is determined to be full, which means, the file data already stored in the buffer Z 37, plus the additional data, reaches the pre-determined block size. At that point, a file data block 35 will be transmitted into the Flash memory 34 from the buffer Z. Any remaining part of the last data portion is retained in the buffer Z. A complete sector of the Flash memory 34 can be written, thereby avoiding erasing and re-writing for individual bits. The writing efficiency and life expectancy of a Flash memory is increased as a result of the caching process.

Figure 5:
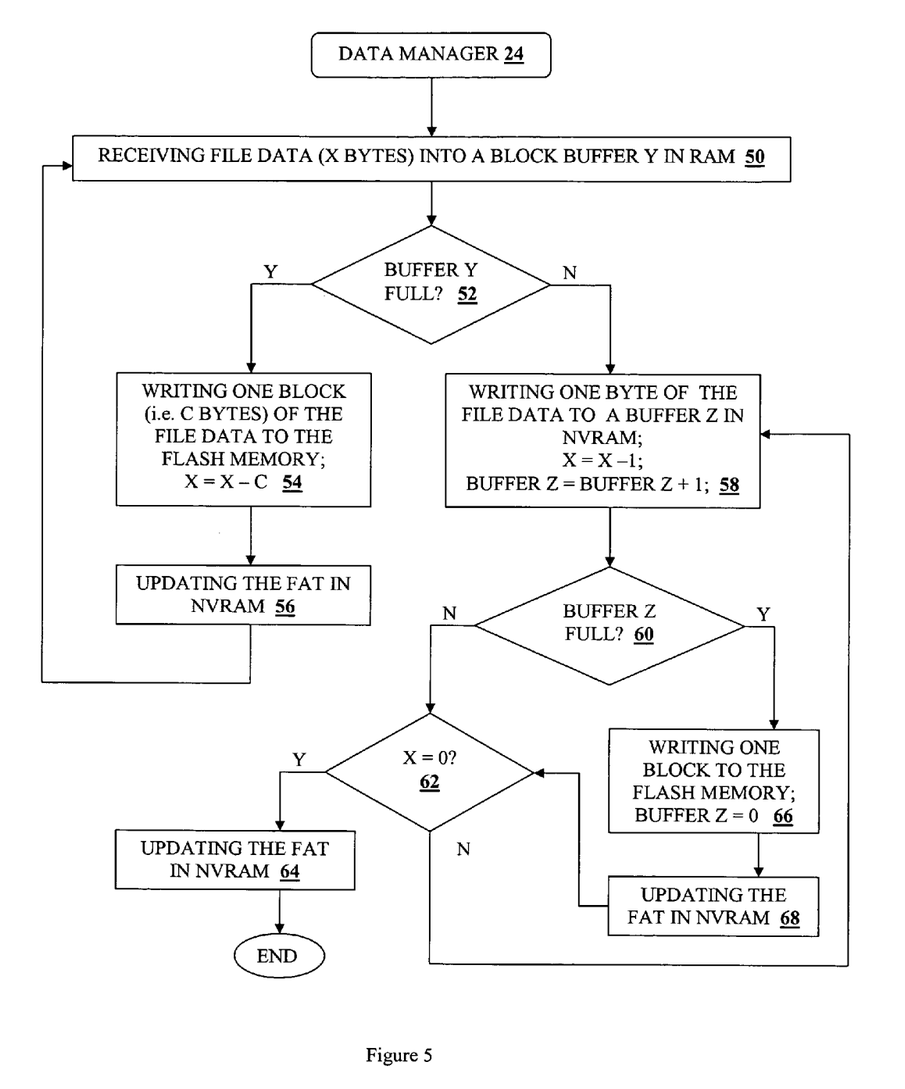
FIG. 5 is a work flow chart of data processing and memory management according to one embodiment of the present invention.

The concrete workflow of the caching process performed by the data manager 24 is demonstrated in FIG. 5. The data manager 24 starts with Step 50 by receiving file data containing X bytes into DRAM 30A. Whenever the file data is to be stored it is sent to the buffer Y 36 in DRAM 30A, and the processor 22 determines whether the buffer Y 36 is full in Step 52. In other words, the processor 22 determines whether data in the buffer Y 36 has reached a pre-defined block size. If the buffer Y 36 is full, one data block of the file data will be written into the Flash memory 34 directly in accordance with Step 54. Meanwhile, the non-file data or FAT 31 in the NVRAM 32 will be updated accordingly, as shown in Step 56.

The same process starting from Step 50 will be repeated against the remaining data bytes (i.e. (X-C) bytes) of the file data until the remaining data is determined to be insufficient to fill the buffer Y 36. In that instance, Step 58 comprises instructions that the remaining file data be written into the buffer Z 37 of the NVRAM one byte at a time. Specifically, the count for data bytes in the buffer Z 37 increases one byte and meanwhile the remaining file data decreases one byte in count. After each byte, Step 60 determines whether the buffer Z 37 is full. If the buffer Z 37 is full, the processor at Step 66 instructs to write one data block from the buffer Z 37 to the Flash memory 34. Once the data block is moved from the buffer Z 37 to the Flash memory 34, the buffer Z 37 is reset as containing zero data bytes. In Step 68, the non-file data or FAT 31 in the NVRAM 32 will be updated accordingly.

Moving to Step 62, the process checks to determine if the last data portion has been completely transferred. If not, the process returns to Steps 58 and writes another byte to the buffer Z. Now the buffer Z 37 cannot become full as determined at Step 60, because the last data portion began less than one block in size. When all the remaining bytes have been transferred and X=0 as determined at Step 62, the process moves to Step 64 where it updates the FAT 31 in the NVRAM 32, and the process ends. If, immediately following a block transfer at Step 68, it is determined at Step 62 that all of the data bytes of the remaining file data have been stored in the buffer Z 37, then again Step 64 will update the FAT 31 in the NVRAM 32 to reflect the data storage in the NVRAM 32 and the Flash memory 34 and complete the process of caching of the last data portion 33.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of memory management in computing devices, said method comprising the steps of:

receiving file data in a computing device;

processing said file data to determine that said file data is composed of one or more data blocks and a last data portion, each of said one or more data blocks having a pre-determined block size, said last data portion having a smaller size than said pre-determined block size;

writing said one or more data blocks into a first memory, said first memory configured to store data blocks having said pre-determined block size and included within a plurality of sectors; and caching said last data portion in a second memory prior to transmitting said last data portion to said first memory, the step of caching said last data portion comprises the steps of:

(A) allocating part of said second memory as a file buffer, said file buffer configured to store file data;

(B) writing data bytes of said last data portion to said file buffer until data in said file buffer is determined to have said pre-determined block size; and (C) responsive to said determination that said data in said file buffer has said pre-determined block size, moving said data from said file buffer to one of any of the available data blocks in the plurality of sectors in said first memory prior to continuing step (B).

2. The method of claim 1, further comprising the steps of:
generating non-file data for said file data; and
storing said non-file data in said second memory.

3. The method of claim 2, wherein said non-file data comprises a File Allocation Table (FAT).

4. The method of claim 1, wherein said first memory is a Flash memory.

5. The method of claim 4, wherein said second memory is a non-volatile random access memory.

6. A computer readable storage medium having instructions for causing a computer to execute a method comprising:

(A) receiving a file data input;

(B) processing said file data input to separate said file data input into one or more data blocks and a last data portion, each of said one or more data blocks containing a threshold number of data bytes, said last data portion including data bytes below said threshold number;

(C) storing said one or more data blocks into a first memory, said first memory configured to store data blocks having said threshold number of data bytes within a plurality of sectors;

(D) writing said last data portion by byte into a second memory until said second memory is determined to include file data bytes equal to said threshold number; and (E) responsive to the determination that said second memory includes file data bytes equal to said threshold number, moving said file data bytes from said second memory to one of any of the available data blocks in the plurality of sectors in said first memory prior to continuing Step (D).

7. The computer readable medium of claim 6, wherein said instructions further comprise the steps of:
generating a non-file data for said file data input; and
storing said non-file data in said second memory.

8. The computer readable medium of claim 7, wherein said non-file data comprises a File Allocation Table (FAT).

9. The computer readable medium of claim 6, wherein said first memory is a block-accessed memory.

10. The computer readable medium of claim 9, wherein said first memory is a Flash memory.

11. The computer readable medium of claim 10, wherein said second memory is a non-volatile random access memory.

12. The computer readable medium of claim 10, wherein said threshold number of data bytes is configurable.

13. A memory management system comprising:
a processor configured to receive and process data;
a memory comprising at least a first memory, said first memory configured to store data blocks having a pre-determined block size within a plurality of sectors, and a second memory; and
a data manager executed by said processor, wherein,
said data manager is programmed to define within said data a number of data blocks, each having a pre-determined block size, and a last data portion that has a smaller size than said pre-determined block size,
said data manager is programmed to allocate space in said first memory for storing said number of data blocks, and
said data manager is further programmed to assign space in said second memory for caching said last data portion,
said last data portion is cached into said second memory through the steps of:

(A) allocating part of said second memory as a file buffer, said file buffer configured to store file data;

(B) writing data bytes of said last data portion to said file buffer until data in said file buffer is determined to have said pre-determined block size; and (C) responsive to said determination that said data in said file buffer has said pre-determined block size, moving said data from said file buffer to one of any of the available data blocks in the plurality of sectors in said first memory prior to continuing step (B).

14. The system of claim 13, wherein said first memory is a block-accessed memory.

15. The system of claim 13, wherein said first memory is a Flash memory.

16. The system of claim 13, wherein said second memory is a non-volatile random accessed memory.

17. The system of claim 13, further comprising an output interface for displaying said data to a user.

18. The system of claim 13, further comprising an input interface for receiving said data.

19. The system of claim 13, further comprising an interface for transmitting said data via a communications network.

20. The system of claim 13, wherein said data manager is further programmed to generate a File Allocation Table (FAT) for said data and store said FAT in said second memory.

21. A hand held apparatus comprising:
a data input device;
a data output device; and
a computing device configured to communicate with said data input device, said output device, and a data source via a communications network, said computing device comprising:
a processor for data processing,
a memory comprising at least a non-volatile random access memory and a block-accessed memory configured to store data blocks having a threshold block size and included within a plurality of sectors,
a data manager, when executed by said processor, comprising the steps of:

(A) identifying, from a file data input, one or more data blocks and a last data portion, each of said one or more data blocks having said threshold block size, said last data portion having a smaller size than said threshold block size;

(B) storing said one or more data blocks into said block-accessed memory;

(C) writing said last data portion by byte into said non-volatile random access memory until said non-volatile random access memory is determined to include file data of said threshold block size; and (D) responsive to the determination that said non-volatile random access memory is determined to include file data of said threshold block size, moving said file data from said non-volatile random access memory to one of any of the available data blocks in the plurality of sectors in said block-accessed memory prior to continuing Step (C).

22. The hand held apparatus of claim 21, wherein said block-accessed memory is a Flash memory.

23. The hand held apparatus of claim 21, wherein said threshold block size is configurable.

24. A system comprising:

a processor;

a dynamic random access memory (DRAM);

a Flash memory configured to store data blocks having a predetermined size and included within a plurality of sectors; and a non-volatile random access memory (NVRAM);

the processor configured to receive input data and store the input data in a buffer of the DRAM, the processor executing a data manager to process the input data into blocks each having a predetermined size, and last data portions each less than the predetermined size of a block, the processor configured to move the blocks of input data from the DRAM to one of any of the available data blocks in the plurality of sectors in the Flash memory, and the processor configured to move the last data portions from the DRAM to the NVRAM.

25. A system as claimed in claim 24 wherein the processor is configured to process the input data until the processor determines that the last data portions stored in the NVRAM have reached the predetermined size and thus constitute a block, the processor configured to move the block of last data portions into the Flash memory in response to the determination that the last data portions have reached the predetermined size.

26. A system as claimed in claim 24 wherein the processor is configured to generate file allocation table (FAT) data tracking the location and status of the input data in the one or more blocks stored in the Flash memory and the last data portions stored in the NVRAM.

* * * * *

UNITED STATES PATENT AND TRADEMARK OFFICE
CERTIFICATE OF CORRECTION

| | |
|---|---|
| PATENT NO. | : 7,562,202 B2 |
| APPLICATION NO. | : 10/903020 |
| DATED | : July 14, 2009 |
| INVENTOR(S) | : Potteiger |

It is certified that error appears in the above-identified patent and that said Letters Patent is hereby corrected as shown below:

Column 4,

Line 22, "Step (C)" should read --Step (D)--; and after "Step (D)." insert the following paragraph:

--In other embodiments of any of the foregoing aspects of the invention, any type of computer memory may be utilized for the first and the second memories. In preferred embodiments, the first memory is a non-volatile memory, such as Flash memory, or a hard drive, or a CD-ROM drive, or the like; and the second memory is also a non-volatile memory, preferably NVRAM.--.

Signed and Sealed this

Twenty-fourth Day of November, 2009

David J. Kappos
*Director of the United States Patent and Trademark Office*